(12) United States Patent
Maier et al.

(10) Patent No.: US 10,486,504 B2
(45) Date of Patent: Nov. 26, 2019

(54) SHADING SYSTEM FOR AN AUTOMOTIVE VEHICLE

(71) Applicants:Matthias Maier, Esslingen (DE);
Roman Sauer, Grossbettlingen (DE)

(72) Inventors: Matthias Maier, Esslingen (DE);
Roman Sauer, Grossbettlingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 153 days.

(21) Appl. No.: 15/479,546

(22) Filed: Apr. 5, 2017

(65) Prior Publication Data
US 2017/0297417 A1   Oct. 19, 2017

(30) Foreign Application Priority Data

Apr. 14, 2016 (DE) .................. 10 2016 206 301

(51) Int. Cl.
*B60J 3/02* (2006.01)
(52) U.S. Cl.
CPC ....................... *B60J 3/02* (2013.01)
(58) Field of Classification Search
CPC ...... B60J 1/2044; B60J 1/2069; B60J 1/2083; B60J 3/02
See application file for complete search history.

(56) References Cited

U.S. PATENT DOCUMENTS 6,910,518 B2 *  6/2005  Zimmermann ........ B60J 1/2019
160/370.21

2003/0094249 A1 *  5/2003  Zimmermann ........ B60J 1/2019
160/370.22

(Continued)

FOREIGN PATENT DOCUMENTS

DE      29921860 U1 *  7/2000  ............ B60J 1/2027
DE      10215331 A1 * 10/2003  ............ B60J 1/2027

(Continued)

OTHER PUBLICATIONS

Search Report of European Patent Office issued in Application No. 17 16 2184 dated Sep. 4, 2017 with English translation of category of documents (10 pages).

(Continued)

*Primary Examiner* — Hilary L Gutman
(74) *Attorney, Agent, or Firm* — Flynn Thiel, P.C.

(57) ABSTRACT

A shading system for a split side window of a vehicle, including a main shading structure held on a main winding shaft for movement between a stowed position and a shading position, and an auxiliary shading structure held on an auxiliary winding shaft for movement between a stowed position and a shading position. The main shading structure has a main pull-out profile on an end region and the auxiliary shading structure has an auxiliary pull-out element on an end region, which are lengthwise displaceable in vehicle-fixed guiding tracks for displacement between the stowed and shading positions. The main pull-out profile and the auxiliary pull-out element are guided on one side in adjacent guiding tracks extending in parallel to each other, and the main pull-out profile is associated with a drag device entraining the auxiliary pull-out element during a longitudinal displacement from the stowed position to the shading position.

24 Claims, 4 Drawing Sheets

(56) References Cited

U.S. PATENT DOCUMENTS

| | | | |
|---|---|---|---|
| 2012/0193044 A1* | 8/2012 | Ojima | B60J 1/2027 |
| | | | 160/370.22 |
| 2013/0048228 A1* | 2/2013 | Ojima | B60J 1/2022 |
| | | | 160/120 |
| 2013/0292961 A1 | 11/2013 | Katada | |
| 2018/0297452 A1* | 10/2018 | Hintennach | B60J 1/2025 |

FOREIGN PATENT DOCUMENTS

| | | | | |
|---|---|---|---|---|
| DE | 102005013115 A1 * | 9/2006 | | B60J 1/2027 |
| DE | 102005013113 A1 * | 10/2006 | | B60J 1/2027 |
| DE | 10 2011 076 892 A1 | 12/2012 | | |
| DE | 102012215433 A1 * | 3/2014 | | B60J 1/2069 |
| EP | 1129871 A1 * | 9/2001 | | B60J 1/2027 |
| EP | 2017105 A1 * | 1/2009 | | B60J 1/2044 |
| EP | 2 660 089 A1 | 11/2013 | | |
| JP | 2008110745 A | 5/2008 | | |
| KR | 20030033985 A * | 5/2003 | | B60J 1/2019 |
| KR | 20090049991 A * | 5/2009 | | B60J 1/2027 |
| WO | WO-2011081019 A1 * | 7/2011 | | B60J 1/2027 |
| WO | WO-2011155420 A1 * | 12/2011 | | B60J 1/2022 |
| WO | WO-2016207189 A1 * | 12/2016 | | B60J 1/2025 |

OTHER PUBLICATIONS

Examination Report of German Patent Office issued in Application No. 10 2016 206 301.4 dated Feb. 8, 2017 (5 pages).

* cited by examiner

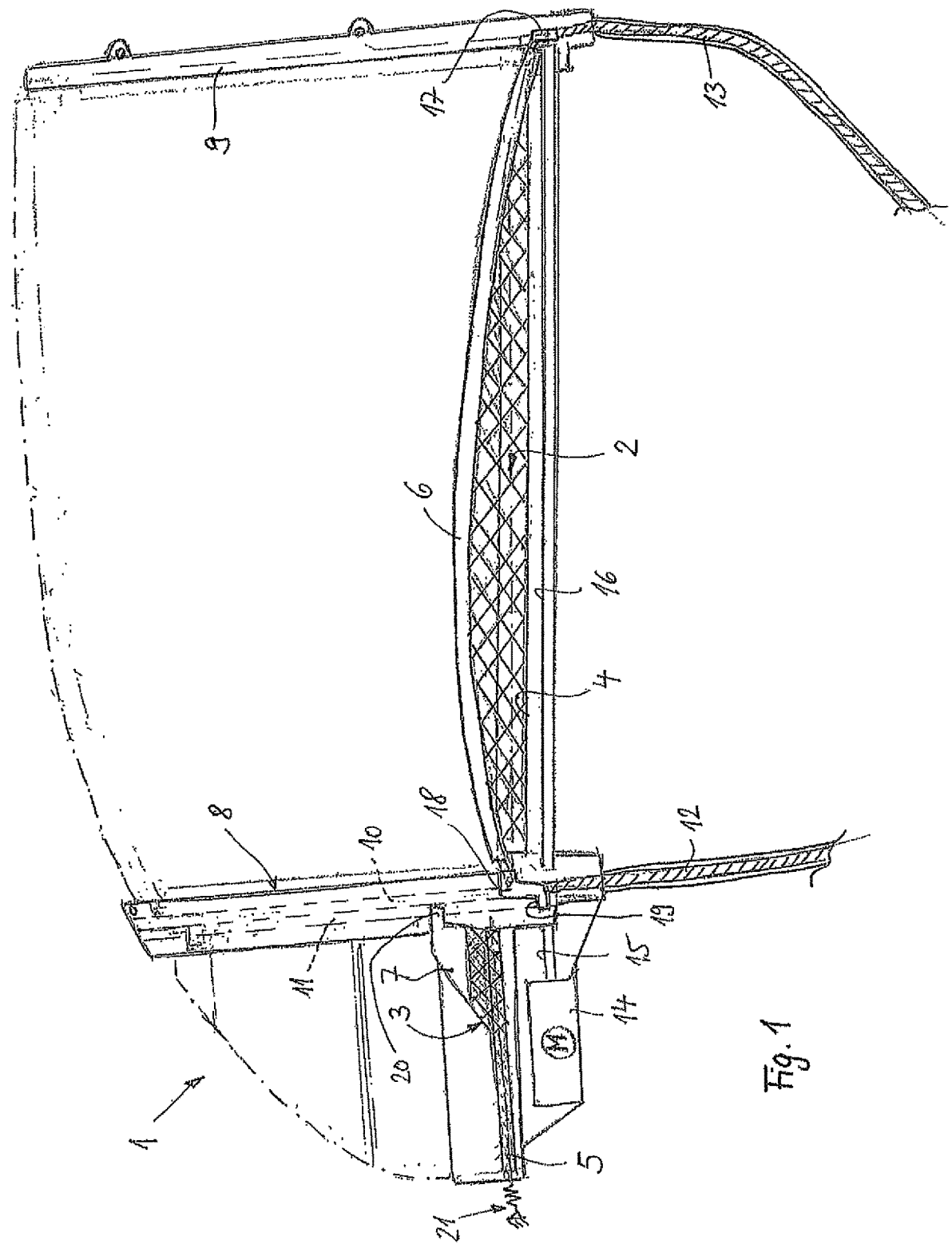

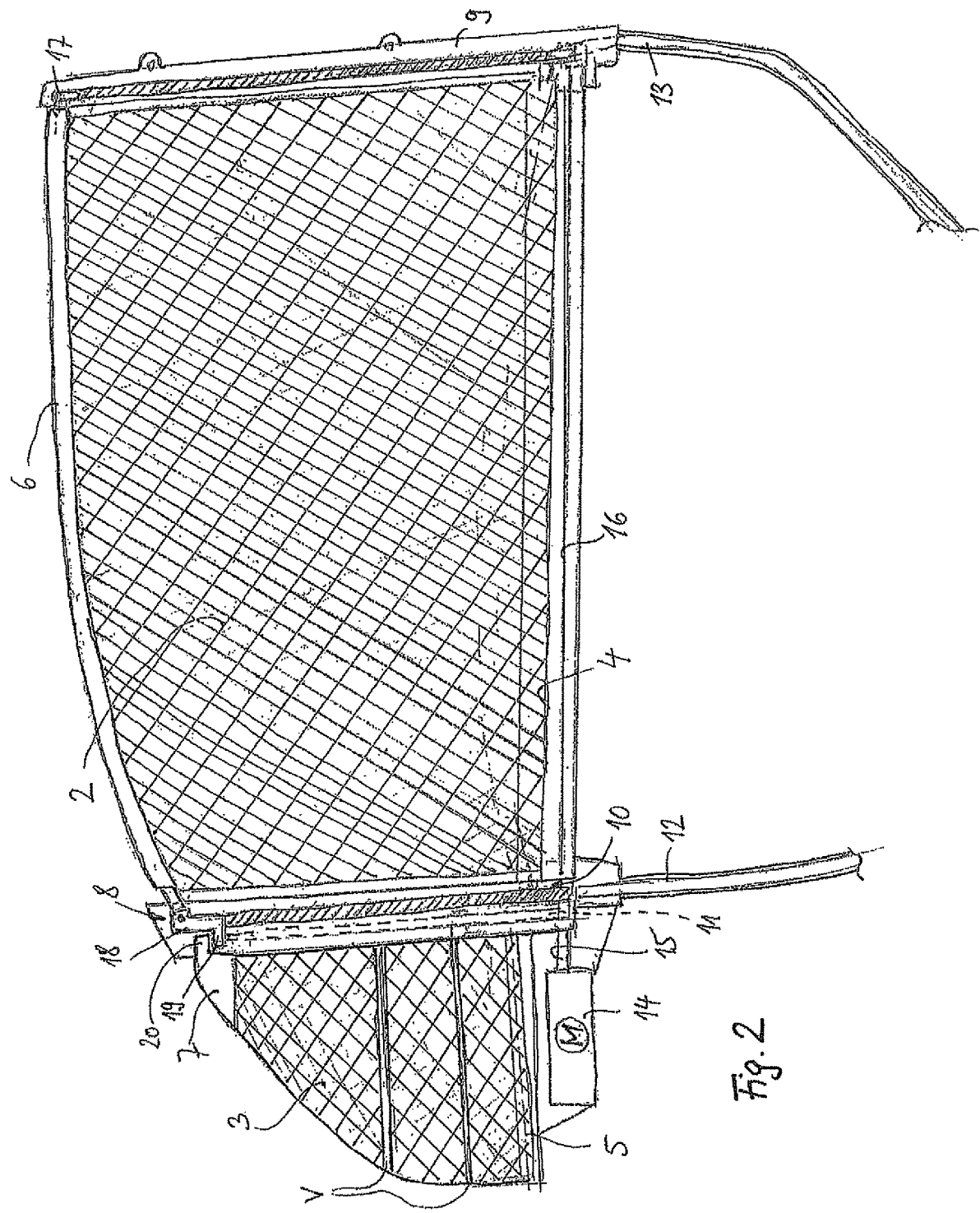

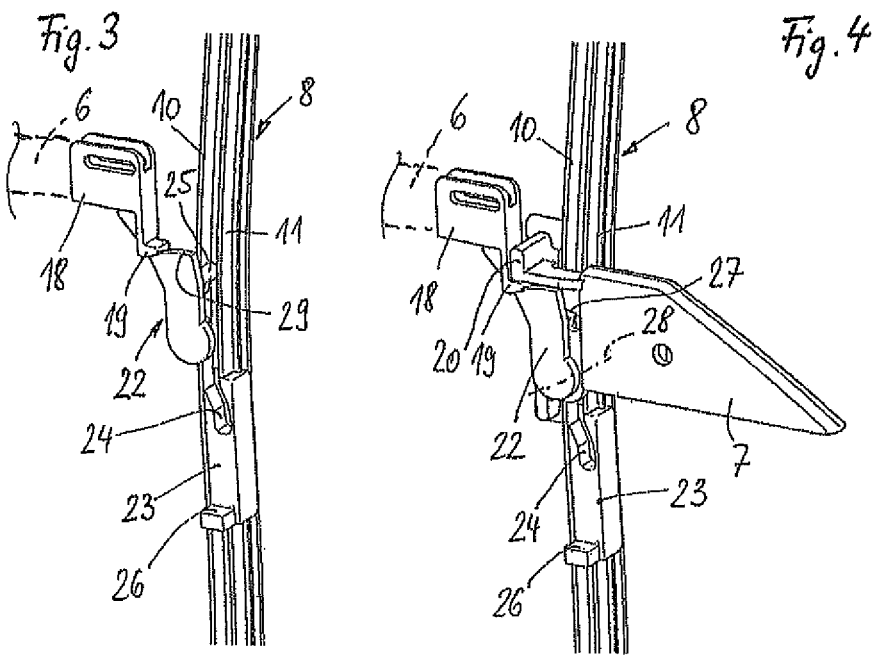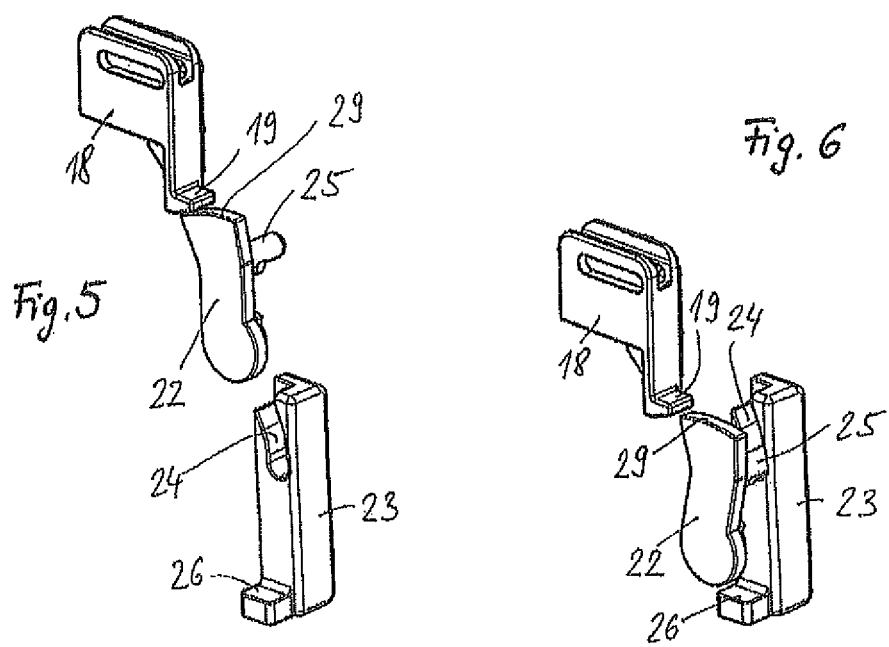

SHADING SYSTEM FOR AN AUTOMOTIVE VEHICLE

This claims priority from German Patent Application No. 10 2016 206 301.4, filed on Apr. 14, 2016, the disclosure of which is hereby incorporated by reference in its entirety.

FIELD OF THE INVENTION

The invention relates to a shading system for an automotive vehicle, which is assigned to a split side window, comprising a main shading structure which is held on a main winding shaft for winding up and off between a stowed position and a shading position, and comprising an auxiliary shading structure which is held on an auxiliary winding shaft for winding up and off between a stowed position and a shading position, wherein the main shading structure is provided with a main pull-out profile on a face end region that is in front in the winding off direction and the auxiliary shading structure is provided with an auxiliary pull-out element on a face end region that is in front in the winding off direction, which are lengthwise displaceable in vehicle-fixed guiding tracks for displacement between the stowed and shading positions.

BACKGROUND OF THE INVENTION

Such a shading system is disclosed in DE 10 2011 076 892 A1. The known shading system is intended for a split side window of a passenger vehicle. The shading system includes a flexible main shading structure and a flexible auxiliary shading structure. Both the main shading structure and the auxiliary shading structure are each mounted on a distinct winding shaft for winding up and off. The two winding shafts are positioned fixed in location in the region of the side window and mechanically coupled to each other by a gear mechanism so that the two winding shafts are in operative connection with each other. The one winding shaft for the main shading structure is oriented approximately horizontally in the region of a window sill. The other winding shaft for the auxiliary shading structure is oriented approximately vertically in the region of a window bar. The main shading structure and the auxiliary shading structure are manually transferable from a stowed position to the shading position, wherein the auxiliary shading structure is associated with a supporting spring drive which, upon a displacement of the main shading structure in the direction towards the shading position, necessarily causes an analogous displacement of the auxiliary shading structure from the stowed position to the shading position.

SUMMARY OF THE INVENTION

An object of the invention is to provide a shading system of the above mentioned type which has a simple construction and allows comfortable transferring of the shading structures between the stowed position and the shading position.

This object is achieved in that the main pull-out profile and the auxiliary pull-out element are guided on one side in adjacent guiding tracks extending in parallel to each other, and in that the main pull-out profile is associated with a drag device entraining the auxiliary pull-out element during a longitudinal displacement from the stowed position to the shading position. The main pull-out profile is preferably guided on opposite sides in two guiding tracks for displacement in parallel. The auxiliary pull-out element is preferably guided merely in a single guiding track extending in parallel to the adjacent guide track of the one side of the main pull-out profile. The auxiliary pull-out element is a dimensionally stable guiding element on the face end region of the auxiliary shading structure. Preferably, the auxiliary shading structure has an essentially triangular design, whereas the main shading structure has an essentially quadrangular design. If also the auxiliary shading structure has an essentially quadrangular design, then the auxiliary pull-out element of the auxiliary shading structure is preferably likewise guided in two opposite guiding tracks for lengthwise displacement. The adjacent guiding tracks extending in parallel to each other are positioned between corresponding shading surfaces of the main shading structure and the auxiliary shading structure. Owing to the solution according to the invention, during a displacement from the stowed position to the shading position, the main pull-out profile necessarily entrains the auxiliary pull-out element so that during winding off and, consequently, pulling out of the main shading structure the auxiliary shading structure is automatically also pulled out, without any need for a separate drive therefor. Advantageously, the two winding shafts for the two shading structures can be rotatably mounted below a window sill, in order to thereby allow accommodation of the winding shafts concealed by a corresponding interior lining of the vehicle. With such an embodiment, the two shading structures are advantageously pulled out essentially upwards in the vehicle vertical direction from their stowed position in the direction towards the shading position, wherein the shading structures completely cover corresponding window pane regions of the side window, at least largely. The auxiliary winding shaft is kinematically separated from the main winding shaft and, consequently, is rotatably mounted independent of the main winding shaft.

In an embodiment of the invention, the drag device includes at least one entrainer element disposed on the main pull-out profile and/or on the auxiliary pull-out element, which entrainer element is configured for entraining the auxiliary pull-out element in the longitudinal displacement direction in a form-fitting manner. Therein, the at least one entrainer element is configured merely for form-fitted entraining in the one displacement direction, namely from the stowed position to the shading position. The at least one entrainer element couples the main pull-out profile to the auxiliary pull-out element mechanically and in a form-fitting manner during a longitudinal displacement movement from the stowed position to the shading position.

In a further embodiment of the invention, the at least one entrainer element is positioned on the side of the adjacent guiding tracks on the main pull-out profile and/or on the auxiliary pull-out element. Consequently, the at least one entrainer element projects preferably from the main pull-out profile towards the auxiliary pull-out element, in order that the main pull-out profile can entrain the auxiliary pull-out element. Similarly, it can be provided that an entrainer element is disposed on the auxiliary pull-out element and projects into the trajectory of the main pull-out profile so that the entrainer element and, thus, also the auxiliary pull-out element are necessarily entrained during a displacement move of the main pull-out profile. As an alternative, it is possible that a respective entrainer element is provided both on the main pull-out profile and on the auxiliary pull-out element which are cooperating in a complementary manner such that they are contacted to each other in a form-fitting manner during a displacement movement of the main pull-out profile.

In a further embodiment of the invention, the adjacent guiding tracks extend at least largely in the vertical direction of the side window. Preferably, the guiding tracks are positioned in the region of a partitioning bar of the split side window. Guiding tracks can be groove-type or rail-type profilings, ridge-type profilings or the like. The adjacent guiding tracks can be integrated in a common, one-piece rail profile, or else be provided in separate rail profiles which are positioned fixed in location relative to the side window and, thus, fixed to the vehicle.

In a further embodiment of the invention, mutually complementary entrainer elements projecting into the respective trajectory of the other one are provided on the main pull-out profile and on the auxiliary pull-out element. The entrainer elements abut in a form-fitting manner in the longitudinal displacement directions of the guiding tracks in order to, thus, cause the desired entraining.

In a further embodiment of the invention, a drive system is provided to displace the main pull-out profile between the stowed position and the shading position of the main shading structure in a forcedly guided manner. The drive system preferably includes threaded helix cables which are installed in the guiding tracks and which are driven by at least one electric motor and an adapted gear mechanism. Advantageously, merely a single electric motor is provided and driving the lengthwise displacement of the main shading structure in that it acts on the two threaded helix cables, disposed in the opposite lateral guiding tracks for the main pull-out profile, via the corresponding gear mechanism. Said driving of the main pull-out profile necessarily also causes transmission of the drive movement to the auxiliary pull-out element and, consequently, to the auxiliary shading structure, due to the drag device. The drive system drives the main pull-out profile and, consequently, the main shading structure in both longitudinal displacement directions, i.e., both from the stowed position to the shading position and from the shading position to the stowed position.

In a further embodiment of the invention, the auxiliary winding shaft is associated with a return spring device to apply torque to the auxiliary winding shaft in the winding-up direction. The return spring device is for secure returning of the auxiliary shading structure to its stowed position.

In a further embodiment of the invention, a mechanical coupling device is provided to couple the main pull-out profile to the auxiliary pull-out element during a longitudinal displacement from the shading position in the direction towards the stowed position. The mechanical coupling device ensures that the auxiliary pull-out element can be returned again by the main pull-out profile from the shading position in the direction towards the stowed position, when the drag device is no longer effective. Consequently, the mechanical coupling device is preferably effective in the opposite longitudinal displacement direction relative to the drag device between main pull-out profile and auxiliary pull-out element.

In a further embodiment of the invention, the mechanical coupling device is associated with a mechanical control device to decouple the auxiliary pull-out element from the main pull-out profile in response to the auxiliary pull-out element reaching the stowed position. The mechanical control device is advantageous in case the longitudinal displacement path of the auxiliary pull-out element for returning from the shading position to the stowed position is shorter than the longitudinal displacement path of the main pull-out profile. Owing to the mechanical control device, the auxiliary pull-out element can be decoupled from the main pull-out profile, once the auxiliary pull-out element has reached the stowed position.

In a further embodiment of the invention, the guiding track associated with the auxiliary pull-out element includes, in the region of the stowed position, a control contour fixed in location, which control contour cooperates with a movable coupling member of the coupling device in response to a direction of movement of the auxiliary pull-out element in such a manner that the auxiliary pull-out element is decoupled from or coupled to the main pull-out profile. The fixed-in-location control contour controls the movable coupling member of the coupling device on or off, depending on whether the auxiliary pull-out element is to be coupled to the main pull-out profile or decoupled therefrom. Indeed, decoupling is feasible merely in the longitudinal displacement direction in which the auxiliary pull-out element is transferred from the shading position to the stowed position. During a transfer of the main pull-out profile and the auxiliary pull-out element from the stowed position to the shading position, the coupling member is actually likewise displaced in the direction towards its coupling condition, however, without said coupling condition being operable during said displacement movement. Namely, during said displacement movement the at least one entrainer assumes the transferring function. Advantageously, the coupling member is a pivotable coupling latch which cooperates with the fixed-in-location control contour by means of a control pin.

In a further embodiment of the invention, the auxiliary shading structure includes at least one reinforcement strip which is oriented transversely to a direction of displacement of the auxiliary shading structure. Said embodiment is advantageous in case the auxiliary shading structure has an essentially triangular design and is displaced merely via a single lateral guiding track by means of the auxiliary pull-out element. Owing to the at least one reinforcement strip, collapsing of the flexible auxiliary shading structure during a winding on or off procedure is prevented. The reinforcement strip contributes to the feature that the auxiliary shading structure remains extensively deployed during a displacement movement between the stowed position and the shading position.

Further advantages and features of the invention will become apparent from the claims and from the description below of a preferred exemplary embodiment of the invention illustrated with reference to the drawings.

BRIEF DESCRIPTION OF THE DRAWINGS

FIG. 1 shows a schematic illustration of an embodiment of a shading system according to the invention, wherein both a main shading structure and an auxiliary shading structure are illustrated in their stowed positions;

FIG. 2 shows the shading system according to FIG. 1 with the main shading structure and the auxiliary shading structure transferred to the shading position;

FIG. 3 shows a section of the shading system of FIGS. 1 and 2 in the region of a coupling device for the shading system in a direction of view that is opposite relative to the direction of view of FIGS. 1 and 2;

FIG. 4 shows the coupling device according to FIG. 3 including an auxiliary pull-out element;

FIG. 5 shows an enlarged illustration of the section according to FIG. 3 with guiding tracks omitted;

FIG. 6 shows an enlarged illustration of the coupling device according to FIG. 5 with a coupling member transferred to a decoupling condition by means of a fixed control contour.

DETAILED DESCRIPTION

Figure 7:
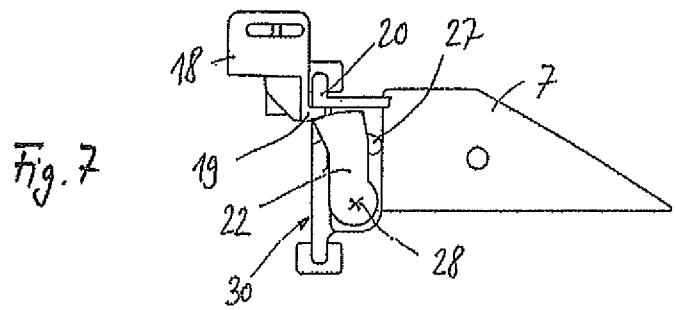
FIGS. 7 to 10 show the coupling device according to FIGS. 3 to 6 in different control conditions.

A passenger vehicle has a side door in a rear section, which side door is provided with a shading system 1 according to FIGS. 1 and 2. With reference to FIGS. 1 and 2, a shading system 1 is illustrated for a left rear-sided side door—as seen in the ordinary driving direction of the passenger vehicle. The shading system 1 is for an interior side shading of window pane regions of the side door, the upper boundary contours thereof indicated in dash-point lines in FIG. 1. A side window comprising the window pane regions of the side door is split in two in that a window bar 8 fixed to the door separates a larger main window pane region from a smaller auxiliary window pane region which—as seen in the ordinary driving direction of the passenger vehicle—is positioned behind the main window pane region.

The shading system 1 includes a main shading structure 2 which covers the main window pane region in a shading position (FIG. 2). The shading system 1 includes, furthermore, an auxiliary shading structure 3 which covers the auxiliary window pane region of the side window of the side door in its shading position (FIG. 2). The main shading structure 2 is held on a main winding shaft 4 for winding up and off, which shaft is disposed and rotatably mounted fixed in location, i.e., fixed to the door, below a window sill of the side door. A rotational axis of the main winding shaft 4 extends at least largely in the longitudinal direction of the vehicle. The main shading structure 2 is capable of being pulled-out upwards essentially in the vehicle vertical direction along an interior side of the main window pane region of the side door from a stowed position according to FIG. 1 to a shading position according to FIG. 2. In the stowed position the main shading structure 2 is wound up on the main winding shaft 4, in the shading position the main shading structure 2 is wound off the main winding shaft 4 and deployed extensively upwards. In order to allow extensive deployment of the main shading structure 2, the main shading structure 2 has a dimensionally stable main pull-out profile 6 on its face end region that is in front in the winding off direction, i.e. the pull-out direction, which profile is guided on its opposite face sides by means of guiding members 17, 18 in lateral guiding tracks 9, 10 for lengthwise displacement, so that the main pull-out profile 6 is displaced in parallel, at least largely, between the stowed position and the shading position relative to the main window pane region. The lateral guiding tracks 9, 10 are embodied in guiding rails which flank the main window pane region laterally and are disposed fixed to the door. The left guiding track 10, as illustrated in the drawings according to FIGS. 1 and 2, for the main pull-out profile 6 is integrated in the window bar 8 of the side door. The guiding member 18 and the guiding member 17 are both part of the main pull-out profile 6. The two guiding members 17 and 18 for the main pull-out profile 6, which are shiftably guided in the lateral guiding tracks 9 and 10 for linear movement, are each connected to a threaded helix cable 12, 13. Each of the threaded helix cables 12, 13 is shiftably mounted for linear movement in channels held fixed to the door, not illustrated in more detail. The two threaded helix cables 12, 13 are flexible and constitute drive transmission means capable of transferring both tensile and compressive forces. In the region of the lateral guiding tracks 9 and 10 the threaded helix cables 12, 13 are guided in corresponding guiding channels which extend in parallel to the lateral guiding tracks 9 and 10. Both the threaded helix cables 12, 13 are part of a drive system, in order to displace the main shading structure 2 between the stowed position and the shading position. The threaded helix cables 12, 13 are driven synchronously by a common electric motor 14 which cooperates synchronously with the two threaded helix cables 12, 13 by means of a merely schematically illustrated drive train 15, 16. The drive train 15, 16 includes a gear mechanism comprising worm wheels which cooperate with the threaded helix cables 12, 13. Furthermore, the drive train 15, 16 includes a synchronizing shaft for synchronous drive transmission of the drive force of the electric motor 14 to the two threaded helix cables 12, 13. The electric motor 14 and the drive train 15, 16 are directly spatially associated with the main winding shaft 4 of the main shading structure 2 in that the electric motor 14 is positioned laterally beside the main winding shaft 4 and the drive train 15, 16 extends in the region of the winding shaft 4. In the embodiment as illustrated, the drive system 14 to 16 is used not only for drive transmission to the threaded helix cables 12, 13 and, thus, to the main pull-out profile 6, but also for torque transmission to the winding shaft 4 itself, and actually in both winding directions. As a result, a low tension and uniform winding on and off of the main shading structure 2 is possible.

Furthermore, the shading system 1 includes the auxiliary shading structure 3 which—like the main shading structure 2—is a flexible sheet material and held on an auxiliary winding shaft 5 for winding up and off. The auxiliary winding shaft 5 is likewise disposed below a window sill fixed to the door and mounted for rotation about a rotational axis. In the winding-up direction a return spring device 21 acts on the auxiliary winding shaft 5, as schematically illustrated in FIG. 1. The auxiliary winding shaft 5 extends at least largely in the longitudinal direction of the vehicle. The auxiliary winding shaft 5 can be oriented coaxially, in parallel or with a minor angular offset in relation to the main winding shaft 4. The auxiliary winding shaft 5 is rotatably mounted independent of the main winding shaft 4.

The entire shading system 1 is positioned on an inner side of the side door facing the vehicle interior.

Figure 8:
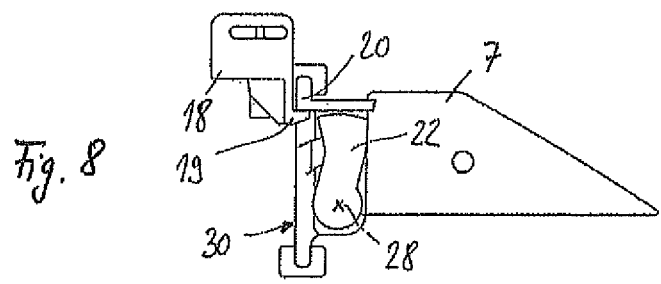
Figure 9:
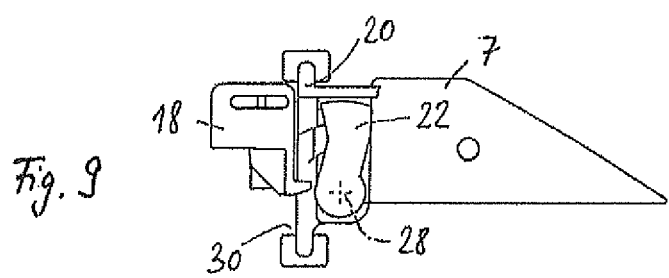
Figure 10:
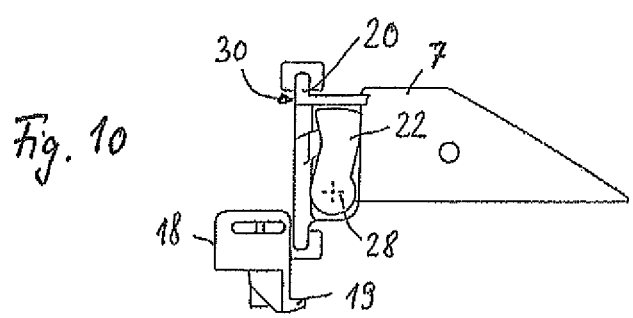

The auxiliary shading structure 3 in its shading position according to FIG. 2 extends at least largely in parallel to the auxiliary window pane region and in the shading position covers the auxiliary window pane region completely. The auxiliary shading structure 3 has an essentially triangular surface form, as is apparent with reference to FIGS. 1 and 2. The auxiliary shading structure 3 is provided, on its face end region that is in front in the winding off direction, i.e. in the pull-out direction, with an auxiliary pull-out element 7 which has a dimensionally stable design and is shaped in the type of a triangular flag. The auxiliary pull-out element 7 is fixedly connected to the auxiliary shading structure 3. The auxiliary pull-out element 7 is guided for lengthwise displacement in a guiding track 11 via a sliding guide 30, as illustrated with reference to FIGS. 4 and 7 to 10. The guiding track 11 is immediately adjacent to the guiding track 10 for the main pull-out profile 6 and extends in parallel to the guiding track 10. The guiding track 11 is integrated in the window bar 8 and embodied as a guiding rail profile. Since the auxiliary shading structure 3 is guided merely on one side in the lateral guiding track 11, the auxiliary shading structure 3 has two mutually parallel, spaced reinforcement strips V (FIG. 2) which extend over a width of the auxiliary shading structure 3 and are oriented in parallel in relation to a rotational axis of the auxiliary winding shaft 5. The reinforcement strips V are applied to a surface of the auxiliary shading structure 3 continuously over the entire length. The return spring device 21 exerts permanent torque in the winding-up direction on the auxiliary winding shaft 5 so that the auxiliary shading structure 3 is retained in its stowed position without any external force acting thereon.

In order to transfer the auxiliary shading structure 3 from the stowed position to the shading position, a drag device is provided which is associated with the main pull-out profile 6 of the main shading structure 2 and entrains the auxiliary pull-out element 7 of the auxiliary shading structure 3 in the direction towards the shading position, once the main pull-out profile 6 is moved upwards from the stowed position in the direction towards the shading position. The drag device includes a first entrainer 19, also referred to as entrainer element, on the lateral guiding member 18 of the main pull-out profile 6 which is shiftably guided for linear movement in the guiding track 10. A second entrainer 20, also referred to as entrainer element, is disposed on the auxiliary pull-out element 7, which entrainer projects into the trajectory of the first entrainer 19 so that the second entrainer 20 comes into form-fitting contact with the first entrainer 19, once the guiding member 18, during its longitudinal displacement in the guiding track upwards, approaches the auxiliary pull-out element 7. The entrainer 19 is rigid and integrally connected to the guiding member 18. The entrainer 20 is rigid and integrally connected to the auxiliary pull-out element 7. The drag device is illustrated in more detail with reference to FIGS. 3 to 10.

The illustration according to FIGS. 3 to 10 is mirror-inverted in relation to the illustration according to FIGS. 1 and 2. Consequently, technically speaking, the illustration according to FIGS. 3 to 10 is associated with the right side door—as seen in the ordinary driving direction of the passenger vehicle—which door is provided with a shading system 1 in the same way as the left side door, as indicated with reference to FIGS. 1 and 2. Since the design and function, with the exception of the inverted arrangement of the two shading systems, are identical, the following explanations in relation to FIGS. 3 to 10 apply likewise to the shading system 1 according to FIGS. 1 and 2.

Since the opposite lateral guiding tracks 9, 10 for the main pull-out profile 6 do not extend exactly in parallel to each other, the main pull-out profile 6 is associated with a telescopic compensating device which is displaceably mounted relative to the guiding member 18 transversely to the pull-out direction of the main shading structure. Consequently, the guiding member 18 has a long hole, clearly visible with reference to FIGS. 3 to 6.

Furthermore, it is apparent with reference to FIGS. 3 to 10 that the shading system 1 does not only include a drag device for transferring the auxiliary shading structure 3 from the stowed position to the shading position, but also that a coupling device 22 to 26 is provided to couple the auxiliary pull-out element 7 to the guiding member 18 of the main pull-out profile 6 even during a longitudinal displacement in the opposite direction downwards from the shading position in the direction towards the stowed position. The mechanical coupling device 22 to 26 includes a latch-type coupling member 22 mounted on the auxiliary pull-out element 7 in the region of the sliding guide 30 for pivoting about a pivot axis 28. The pivot axis 28 is oriented such that the coupling member 22 is pivotable in a plane parallel to a plane of deployment of the auxiliary shading structure. The pivoting move of the coupling member 22 relative to the auxiliary pull-out element 7 is limited by a circular arc-shaped sliding track 27. The coupling member 22 has an abutment surface 29 on its upper end rim, which abutment surface can take support in a form-fitting manner in the region of an underside of the entrainer 19 of the guiding member 18 of the main pull-out profile 6. The coupling member 22 is provided with a control pin 25 in the region of its rear side, which control pin is oriented in parallel to the pivot axis 28. The control pin 25 traverses the sliding track 27 and extends beyond a rear side of the auxiliary pull-out element 7, in order to be able to plunge into a fixed-in-location control contour 24 of a stop block 23 fixed to the window bar 8. The stop block 23 is fixed in the region of the guiding track 11 and defines an end stop for the stowed position of the auxiliary shading structure 3. The control contour 24 has a control ramp which is used to move the coupling member 22 out from the coupling position relative to the entrainer 19 of the guiding member 18, in order to decouple the auxiliary pull-out element 7 from the main pull-out profile 6. This is required, since the auxiliary pull-out element 7 covers a shorter distance than the guiding member 18 of the main pull-out profile 6 during a transfer from the shading position to the stowed position. Namely, the stowed position for the main shading structure 2 is located below the stowed position for the auxiliary shading structure 3, as is apparent with reference to FIG. 1. The control contour 24 and the control pin 25 are components of a control device which is configured to couple the coupling member 22 to the main pull-out profile in response to a longitudinal displacement function of the auxiliary pull-out element or to decouple it therefrom.

During a movement from the shading position downwards in the direction towards the stowed position, according to FIGS. 3 and 4, the entrainer 19 of the guiding member 18 is, consequently, trapped between the above located entrainer 20 of the auxiliary pull-out element 7 and the below located abutment surface 29 of the coupling member 22. Once the auxiliary pull-out element 7 approaches its stowed position, the control pin 25 of the coupling member 22 plunges into the control contour 24 of the fixed-in-location stop block 23 and is pivoted sidewards in the direction towards the auxiliary pull-out element 7. As a result, the underside of the entrainer 19 of the guiding member 18 is released so that the guiding member 18 can be moved further downwards. The coupling member 22, however, parks the auxiliary pull-out element 7 in its lower end position, i.e., in the stowed position. Securing of the auxiliary pull-out element 7 in the stowed position is obtained in that the auxiliary pull-out element 7 touches an end stop 26 which, likewise, is preformed on the stop block 23.

Once the main pull-out profile 6 is displaced again from the stowed position upwards via the drive system, the entrainer 19 necessarily also entrains the entrainer 20 of the auxiliary pull-out element 7, whereby the coupling member moves out from the pocket-shaped control contour 24 of the stop block 23, and thereby is pivoted in the direction towards the guiding member 18. To support the pivot movement in the direction towards the coupling condition, i.e. in the direction towards the guiding member 18, the pivot axis 28 can be provided with a coaxially disposed spring device which exerts permanent torque on the coupling member 22 in the direction towards the coupling condition. Consequently, once the coupling member 22 and its control pin 25 is released from the control contour 24, the coupling member 22 is necessarily pivoted to the left towards the coupling condition (according to the illustrations in the drawings of FIGS. 3 to 10). Now, the entrainer 19 of the guiding member 18 is again trapped between the coupling member 22 and the entrainer 20 of the auxiliary pull-out element 7 positioned thereabove so that a displacement of the main pull-out profile 6 initiated by the drive system causes a forced entraining of the auxiliary pull-out element 7 and, consequently, of the auxiliary shading structure 3.

The invention claimed is:

1. A shading system for a split side window of an automotive vehicle, comprising a main shading structure supported on a main winding shaft for winding up and off between a stowed position and a shading position, an auxiliary shading structure supported on an auxiliary winding shaft for winding up and off between a stowed position and a shading position, the main shading structure having an end region that is a leading end region of the main shading structure during unwinding of the main shading structure from the main winding shaft in a winding off direction, the main shading structure having a main pull-out profile on the leading end region thereof, the main pull-out profile being dimensionally stable and extending along substantially an entire widthwise extent of the main shading structure, the auxiliary shading structure having an end region that is a leading end region of the auxiliary shading structure during unwinding of the auxiliary shading structure from the auxiliary winding shaft in a winding off direction, the auxiliary shading structure having an auxiliary pull-out element on the leading end region thereof, the main pull-out profile and the auxiliary pull-out element being displaceable in vehicle-fixed rails between the respective stowed and shading positions, the main pull-out profile and the auxiliary pull-out element each being respectively guided on one side in first and second ones of the rails, the first and second rails being disposed immediately sidewardly adjacent one another and extending parallel to each other, the shading system further comprising a drag device associated with the main pull-out profile, the drag device entraining the auxiliary pull-out element during a displacement of the main shading structure from the stowed position thereof to the shading position thereof, the second rail defining therein a guiding track which is substantially linear, and the auxiliary pull-out element is guidably supported in the guiding track of the second rail for substantially linear movement therealong during a displacement of the main shading structure from the stowed position thereof to the shading position thereof.

2. The shading system according to claim 1, wherein the drag device includes at least one entrainer element disposed on the main pull-out profile and/or on the auxiliary pull-out element, the entrainer element being configured for entraining the auxiliary pull-out element in a form-fitting manner during displacement of the main shading structure from the stowed position to the shading position.

3. The shading system according to claim 2, wherein the at least one entrainer element is positioned on a side of the first and second guiding rails.

4. The shading system according to claim 1, wherein the first and second rails both extend substantially linearly and substantially in a vertical direction of a split side window of an automotive vehicle.

5. The shading system according to claim 1, wherein the drag device includes mutually complementary entrainer elements respectively disposed on the main pull-out profile and on the auxiliary pull-out element, each entrainer element projecting into a trajectory of the other entrainer element.

6. The shading system according to claim 1, further comprising a drive system for displacing the main pull-out profile between the stowed position and the shading position of the main shading structure in a forcedly guided manner.

7. The shading system according to claim 1, further comprising a return spring device associated with the auxiliary winding shaft to apply torque thereto in a winding-up direction.

8. The shading system according to claim 1, further comprising a mechanical coupling device coupling the main pull-out profile to the auxiliary pull-out element during displacement from the shading position in a direction towards the stowed position.

9. The shading system according to claim 8, further comprising a mechanical control device associated with the mechanical coupling device to decouple the auxiliary pull-out element from the main pull-out profile in response to the auxiliary pull-out element reaching the stowed position thereof.

10. The shading system according to claim 9, wherein the second rail associated with the auxiliary pull-out element includes, in a region of the stowed position of the auxiliary shading structure, a control contour fixed in location relative to the second rail, the control contour cooperating with a movable coupling member of the mechanical coupling device in response to a direction of movement of the auxiliary pull-out element in such a manner that the auxiliary pull-out element is decoupled from or coupled to the main pull-out profile.

11. The shading system according to claim 1, wherein the auxiliary shading structure includes at least one reinforcement strip oriented transversely to a direction of displacement of the auxiliary shading structure.

12. The shading system according to claim 1, further including a control device configured to decouple the auxiliary pull-out element from the main pull-out profile in response to the auxiliary pull-out element reaching the stowed position thereof.

13. The shading system according to claim 1, further including a coupling and decoupling arrangement which couples said main pull-out profile to said auxiliary pull-out element during displacement of said main pull-out profile from the shading position to the stowed position, and which decouples said auxiliary pull-out element from said main pull-out profile when said auxiliary pull-out element reaches the stowed position thereof.

14. The shading system of claim 13, wherein said main pull-out profile has an end guidably supported on said first rail and said auxiliary pull-out element has an end guidably supported on said second rail, said drag device includes a first entrainer element fixed to said end of said main pull-out profile and a second entrainer element fixed to said end of said auxiliary pull-out element, said first and second entrainer elements being configured and disposed to cooperatively engage one another during displacement of said main pull-out profile from the stowed position to the shading position thereof, said coupling and decoupling arrangement includes a latch member movably mounted on said end of said auxiliary pull-out element, said latch member having a surface disposed in vertically-spaced relation with said second entrainer element, said first entrainer element being disposed between said surface and said second entrainer element to couple said main pull-out profile to said auxiliary pull-out element during displacement of said main pull-out profile from the shading position thereof towards the stowed position thereof, said coupling and decoupling arrangement further including a stop member disposed adjacent said second rail and being non-movable relative thereto, said stop member defining an end stop for said auxiliary shading structure in the stowed position thereof, said stop member defining a control contour thereon, said control contour being configured to move said surface of said latch member out of engagement with said first entrainer element to decouple said auxiliary pull-out element from said main pull-out profile as said auxiliary shading structure approaches the stowed position thereof.

15. A shading system for a split side window of a vehicle, said shading system comprising:
a main winding shaft;
a flexible and sheet-shaped main shading structure having a first end region and a second end region spaced therefrom along a lengthwise extent of said main shading structure, said main shading structure being supported on said main winding shaft such that said main shading structure is windable around said main winding shaft and unwindable from said main winding shaft to define respective stowed and shading configurations of said main shading structure, said first end region being fixed to said main winding shaft and said second end region being a leading end region of said main shading structure when same is unwound from said main winding shaft;
a main pull-out profile fixed to said second end region of said main shading structure, said main pull-out profile being dimensionally stable and extending along substantially an entirety of a widthwise extent of said second end region of said main shading structure defined transversely to the lengthwise extent thereof;
an auxiliary winding shaft;
an auxiliary shading structure having a first end region and a second end region spaced therefrom along a lengthwise extent of said auxiliary shading structure, said auxiliary shading structure being supported on said auxiliary winding shaft such that said auxiliary shading structure is windable around said auxiliary winding shaft and unwindable from said auxiliary winding shaft to define respective stowed and shading configurations of said auxiliary shading structure, said first end region of said auxiliary shading structure being fixed to said auxiliary winding shaft and said second end region of said auxiliary shading structure being a leading end region of said auxiliary shading structure when same is unwound from said auxiliary winding shaft;
an auxiliary pull-out element fixed to said second end region of said auxiliary shading structure;
a plurality of elongate rails, said main pull-out profile and said auxiliary pull-out element being respectively displaceable within and relative to first and second ones of said plurality of guiding tracks rails between their respective stowed and shading configurations, said first and second rails being disposed immediately sidewardly adjacent one another and substantially parallel to one another, said main pull-out profile having an end guidably supported on said first rail and said auxiliary pull-out element having an end guidably supported on said second rail, said second rail including a substantially linear guiding track; and
a drag arrangement cooperating between said main pull-out profile and said auxiliary pull-out element, said drag arrangement entraining said auxiliary pull-out element during a displacement of said main pull-out profile from the stowed configuration to the shading configuration, said auxiliary pull-out element being guidably supported by said guiding track of said second rail for substantially linear movement therealong during a displacement of said main pull-out profile from the stowed configuration to the shading configuration.

16. The shading system according to claim 15, wherein said end of said main pull-out profile is a first end and said main pull-out profile has a second end spaced from said first end along the widthwise extent of said main shading structure, a third one of said plurality of rails is disposed in sidewardly-spaced relation from said first rail, said second end of said main pull-out profile being guidably supported on said third rail, and said main pull-out profile extends between said first and third rails.

17. The shading system according to claim 15, wherein said drag arrangement includes a first entrainer element fixed to said end of said main pull-out profile and a second entrainer element fixed to said end of said auxiliary pull-out element, said first and second entrainer elements being configured and disposed to cooperatively engage one another during displacement of said main pull-out profile from the stowed configuration to the shading configuration thereof.

18. The shading system according to claim 17, further including a coupling and decoupling arrangement which couples said main pull-out profile to said auxiliary pull-out element during displacement of said main pull-out profile from the shading configuration towards the stowed configuration, and which decouples said auxiliary pull-out element from said main pull-out profile when said auxiliary pull-out element reaches the stowed configuration thereof.

19. The shading system according to claim 18, wherein said coupling and decoupling arrangement includes a latch member movably mounted on said end of said auxiliary pull-out element, said latch member having a surface disposed in vertically-spaced relation with said second entrainer element, said first entrainer element being disposed between said surface and said second entrainer element to couple said main pull-out profile to said auxiliary pull-out element during displacement of said main pull-out profile from the shading configuration towards the stowed configuration.

20. The shading system according to claim 19, wherein said coupling and decoupling arrangement further includes a stop member disposed adjacent said second rail in anonmovable manner relative thereto, said stop member defining an end stop for said auxiliary shading structure in the stowed configuration thereof, said stop member defining a control contour thereon, said control contour being configured to move said surface of said latch member out of engagement with said first entrainer element to decouple said auxiliary pull-out element from said main pull-out profile as said auxiliary shading structure approaches the stowed configuration thereof.

21. The shading system according to claim 1, wherein the main and auxiliary winding shafts are oriented horizontally and are substantially parallel with one another, and the guiding track of the second rail is substantially linear along a substantial part of a length thereof.

22. The shading system according to claim 1, wherein the main winding shaft and the auxiliary winding shaft are oriented such that the winding off direction of each of the main shading structure and the auxiliary shading structure is vertically upwards during a displacement of the main shading structure from the stowed position thereof to the shading position thereof.

23. The shading system according to claim 15, wherein said main and auxiliary winding shafts are oriented substantially horizontally and are substantially parallel with one another, and the guiding track of the second rail is substantially linear along a substantial part of a length thereof.

24. The shading system according to claim 15, wherein said main winding shaft is oriented such that said main shading structure unwinds therefrom in a vertically upward direction during a displacement of said main pull-out profile from the stowed configuration to the shading configuration, and said auxiliary winding shaft is oriented such that said auxiliary shading structure unwinds therefrom in a vertically upward direction during a displacement of said main pull-out profile from the stowed configuration to the shading configuration.

* * * * *